Patented June 7, 1927.

1,631,322

UNITED STATES PATENT OFFICE.

ANTHONY M. KOHLER, OF EAST LIVERPOOL, OHIO, ASSIGNOR TO THE BABCOCK & WILCOX COMPANY, OF BAYONNE, NEW JERSEY, A CORPORATION OF NEW JERSEY.

MONOLITHIC STRUCTURE AND PROCESS OF MAKING THE SAME.

No Drawing. Application filed June 9, 1925. Serial No. 36,057.

This present invention relates to structures that may be termed monolithic, such as crowns, arches, linings, side walls, muffles, etc., which are adapted for use under high temperature furnace conditions. One of the objects of the invention is to provide such a structure, having refractory qualities similar to the best fire-brick, but without the cemented joints incident to the use of fire-brick, and which, furthermore, possesses marked advantages in ease of construction.

In carrying out my invention, I preferably form a plastic mass which may be made up of one or more highly refractory materials, a bonding material of high melting point and water. In case the high melting point bonding material is insufficient to act also as a temporary binder, I may use an additional material, such as glucose, molasses and the like, which will serve as a temporary binder, or I may use the temporary binder without the bonding material. After the structure has been shaped, it is subjected to a preliminary heating preferably out of contact with the atmosphere of the furnace to a temperature sufficiently high to give to the structure as a whole enough rigidity to enable it to maintain its shape or to stand alone, and even sustain a certain amount of external weight. The structure is then subjected to the full heat of the furnace by being exposed to the free flame therein.

As the principal ingredient in the plastic mass, I preferably use grains of refractory material, which material has been burned at a temperature near enough to maximum to which the structure will be exposed in service to reduce the shrinkage which may occur in such service to negligible proportions.

Previous to the preliminary heating, as mentioned above, I may conveniently shape the plastic mass upon a form made of sheet metal or other suitable material, and then heat it indirectly by heat transmitted through the sheet metal or other material, thereby subjecting this mass to suitable temperatures until the requisite rigidity has been attained. It is believed that the initial heat carbonizes or cokes the binding material and that this coke-like carbon initially cements the particles of the mass while the high melting point bonding material is being sintered to a condition where it, in turn, will cement the particles of clinkered grains.

Without intending in any way to limit myself to the specific details, I may mention that I have obtained satisfactory results by using the following compositions and observing the following conditions: I mix 90 parts of bauxite which had been treated so as to produce spongy clinkered grains free from definite cleavage planes, as described in Letters Patent No. 1,289,049, with 10 parts of raw ground kaolin. To this mixture was added a solution of 25 per cent glucose in water until the desired consistency, e. g., that of molding sand, was obtained. The mass was then shaped and tamped to bring the clinkered particles together firmly into a structure of the desired shape, such as a furnace muffle or furnace roof, the material being laid upon or lined with a thin steel sheet. The structure was then heated to about 1000° F. The sheet or lining was then removed, whereupon it was found that the structure in the shape of an arch, had sufficient rigidity to maintain its own weight. After the metal sheet was removed, the structure was again heated. For this second heat treatment, I found it preferable to use a reducing atmosphere in the furnace. Some of the inside surfaces of the structure were directly exposed to the flames and the heating was continued until the exposed surfaces had attained a temperature in excess of 3000° F.

Other compositions which have been successfully used are 60 parts of calcined bauxite, and 40 parts of a bond composed of 70 per cent calcined kaolin and 30 per cent raw kaolin mixed with a suitable quantity of water and glucose; 70 parts of calcined bauxite and 30 parts of untreated raw bauxite, together with the desired amount of water and glucose. In general, I may employ any highly refractory alumina or alumina-silica containing materials which, at the highest flame temperatures, e. g., up to 3000° F., will sinter sufficiently to give a cohesive structure, but it will be understood that the invention is not limited to any specific refractory materials.

I claim:—

1. The method of making a monolithic structure which comprises heating a shaped plastic refractory mass containing material having a melting point in excess of 3000° F. shielded from the free flame of the furnace until the mass acquires sufficient rigidity to sustain its own weight and thereafter heating said mass with a free flame until the desired cohesion and rigidity are obtained.

2. The method of making a monolithic structure which comprises heating a shaped plastic refractory mass containing material having a melting point in excess of 3000° F. and containing a temporary binder, shielded from the free flame of the furnace until the mass acquires sufficient rigidity to sustain its own weight and thereafter heating said mass with a free flame until the desired cohesion and rigidity are obtained.

3. The method of making a monolithic structure which comprises heating a shaped plastic refractory mass containing alumina-silica materials having a melting point in excess of 3000° F.

4. The method of making a monolithic structure which comprises heating a shaped plastic refractory mass containing alumina-silica materials having a melting point in excess of 3000° F., and containing a temporary binder.

5. The method of making a monolithic structure which comprises heating a shaped plastic mass containing particles of calcined refractory bauxite and a refractory bonding material shielded from the free flame of the furnace until the mass acquires sufficient rigidity to sustain its own weight and thereafter heating said mass with a free flame until the desired cohesion and rigidity are obtained.

6. The method of making a monolithic structure which comprises heating a shaped plastic mass containing particles of calcined refractory bauxite and a refractory bonding material shielded from the free flame of the furnace until the mass acquires sufficient rigidity to sustain its own weight and thereafter heating said mass to a temperature in excess of 3000° F. with a free flame.

7. The method of making a monolithic structure which comprises heating a shaped plastic mass containing particles of calcined refractory bauxite, a refractory bonding material, and a temporary binder, shielded from the free flame of the furnace until the mass acquires sufficient rigidity to sustain its own weight and thereafter heating said mass to a temperature in excess of 3000° F. with a free flame.

8. The method of making a monolithic structure which comprises heating a shaped plastic refractory mass in a reducing atmosphere until the mass acquires sufficient rigidity to sustain its own weight and thereafter heating said mass with a free flame until the desired cohesion and rigidity are obtained.

9. A refractory monolithic structure having a softening point in excess of 3000° F. shaped to form an integral part of a furnace lining, said structure being burned on the surfaces exposed to the direct furnace heat only.

10. A refractory monolithic structure comprising particles of alumina-silica materials having a melting point in excess of 3000° F. bonded by a material also having a melting point in excess of 3000° F. shaped to form an integral part of a furnace lining, said structure being burned on the surfaces exposed to the direct furnace heat only.

11. A refractory monolithic structure comprising particles of highly refractory bauxite bonded by an alumina-silica refractory material having a melting point in excess of 3000° F. shaped to form an integral part of a furnace lining, said structure being burned on the surfaces exposed to the direct furnace heat only.

12. The method of making a monolithic structure which comprises heating a shaped plastic refractory mass containing about 9 parts of spongy clinkered bauxite grains to one part of raw grained kaolin.

13. The method of making a monolithic structure which comprises heating a shaped plastic refractory mass containing about 9 parts of spongy clinkered bauxite grains to one part of raw grained kaolin, and containing a temporary binder.

ANTHONY M. KOHLER.